US007188538B2

(12) United States Patent
Beck

(10) Patent No.: US 7,188,538 B2
(45) Date of Patent: Mar. 13, 2007

(54) HAZARDOUS MATERIAL DETECTOR FOR DETECTING HAZARDOUS MATERIAL IN A MAILSTREAM

(75) Inventor: Christian A. Beck, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 502 days.

(21) Appl. No.: 10/065,286

(22) Filed: Sep. 30, 2002

(65) Prior Publication Data

US 2004/0074321 A1 Apr. 22, 2004

(51) Int. Cl.
*B65D 27/04* (2006.01)
*G01N 31/22* (2006.01)

(52) U.S. Cl. .................. 73/865.8; 73/28.01; 73/31.01; 73/31.02; 229/68.1; 229/71; 422/86; 422/87

(58) Field of Classification Search ............... 73/865.8; 422/83, 86–88; 229/68.1, 68.2, 69, 70–84, 229/300–316
See application file for complete search history.

(56) References Cited

U.S. PATENT DOCUMENTS 4,840,919 A * 6/1989 Attar .......................... 436/111
5,179,281 A * 1/1993 Tawil et al. ................ 250/337
6,295,506 B1 * 9/2001 Heinonen et al. ........... 702/104
6,524,846 B1 * 2/2003 Robinson, Jr. ........... 435/287.4
2002/0060247 A1 * 5/2002 Krishnaswamy et al. ..................... 235/472.01
2002/0072733 A1 * 6/2002 Flaherty .................. 604/890.1
2002/0083022 A1 * 6/2002 Algazi ........................ 705/408
2002/0123671 A1 * 9/2002 Haaland ..................... 600/300
2003/0075593 A1 * 4/2003 Wood .......................... 229/71
2003/0080550 A1 * 5/2003 Phillips ...................... 283/116
2003/0085266 A1 * 5/2003 Simon ......................... 232/27
2003/0111357 A1 * 6/2003 Black ......................... 205/775
2003/0113228 A1 * 6/2003 Goldsmith et al. ........... 422/56
2003/0140015 A1 * 7/2003 Applebaum ................. 705/406
2003/0194817 A1 * 10/2003 Glynn ........................ 436/181
2004/0046009 A1 * 3/2004 Weisenberg et al. ....... 229/68.1

OTHER PUBLICATIONS

U.S. Appl. No. 60/336,272.*

(Continued)

*Primary Examiner*—Hezron Williams
*Assistant Examiner*—David A. Rogers
(74) *Attorney, Agent, or Firm*—George M. Macdonald; Angelo N. Chaclas; Alberta A. Vitale

(57) ABSTRACT

The invention disclosed herein relates generally to mailpieces and more particularly, a hazardous material detector for detecting hazardous material in a mail stream. The present invention is directed, in general to detector for collecting sample (s) of hazardous materials from a mail processing device. The mailpiece generally comprises an envelope comprising a front side and a back side; holes formed in at least one of the front side or the back side of the envelope; a hazardous material test strip for detecting the presence of hazardous material in contact with the test strip; whereby when hazardous materials are detected by the hazardous material test strip a physical change occurs to the hazardous material test strip and the physical change can be viewed through at least one hole formed in the at least one of the front side or the back side of the envelope. The detector helps to quickly determine whether hazardous materials are present in the mail stream.

16 Claims, 9 Drawing Sheets

OTHER PUBLICATIONS

U.S. Appl. No. 60/340,667.*

"Guardian Reader System Frequently Asked Questions", Alexeter Technologies, LLC., Jul. 15, 2002, pp. 1-2.*

"Plague Bio-Threat Alert Test Strip Specificiation Sheet", Tetracore, May 28, 2002.*

* cited by examiner

HAZARDOUS MATERIAL DETECTOR FOR DETECTING HAZARDOUS MATERIAL IN A MAILSTREAM

BACKGROUND OF INVENTION

1. Field of the Invention

The invention disclosed herein relates generally to mailpieces and more particularly, a hazardous material detector for detecting hazardous material in a mailstream.

2. Background of the Invention

The United States accounts for the largest domestic letter traffic in the world, handling almost 200 billion pieces of mail each year. The United States Postal Service (USPS) employs more than 850,000 employees and operates more than 44,000 post offices throughout the country. In many respects, the economy of the country is dependent upon the postal system being able to efficiently and quickly deliver mailpieces. Any type of major disruption in the delivery of mail could have potentially serious detrimental effects on the country as a whole. In addition to the USPS, various services are used in the United States and other countries for delivery of mail to individuals and businesses to recipients to whom the sender does not want to deliver personally. These services include, for example, the United States Postal Service (USPS) and other courier services, e.g., Federal Express®, Airborne®, United Parcel Service, ® DHL®, etc., hereinafter called "carriers". Unfortunately, sometimes the delivered materials may be illegal and/or hazardous to the health of the recipient and to the party who is delivering the goods, e.g., life-harming.

Soon after the Sep. 11, 2001 terrorist attack on the United States, someone and/or a group of people, has been adding harmful biological agents to the mail such as, for example, the spore-forming bacterium *Bacillus anthracis* (anthrax), within or on a mailpiece. Such contaminants can be carried in several forms, including for example, a powder form. Other examples of life-harming materials are explosives; gun powder; blasting material; bombs; detonators; smokeless powder; radioactive materials; ammunition; atomic weapons; chemical compounds or any mechanical mixture containing any oxidizing and combustible units, or other ingredients in such proportions, quantities, or packing that ignite by fire, friction, concussion, percussion or detonation of any part thereof which may and is intended to cause an explosion; poisons; carcinogenic materials; caustic chemicals; hallucinogenic substances; illegal materials; drugs that are illegal to sell and/or dispense; and substances which, because of their toxicity, magnification or concentration within biological chains, present a threat to biological life when exposed to the environment, etc.

The harmful effects of only a few contaminated mailpieces can be far reaching, as cross-contamination of other mailpieces can easily occur when the mailpieces come in contact with each other or are passed through the same machines during processing. The addition of harmful biological agents to the mail submitted to the USPS has caused the death of some people and necessitated the closure of some post offices and other government office buildings and has caused delays in the processing and delivery of mail. The Centers for Disease Control and Prevention estimates that tens of thousands of mailpieces could have become cross-contaminated from only two contaminated mailpieces. The use of the postal system for such purposes has resulted in the need for a reliable way to detect small amounts of loose and possibly dangerous particulate matter present in mail processing machines so as to reduce the number of mailpieces that can become cross contaminated by the mail sorting machine by identifying the contamination early through testing. This will also reduce the number of contaminated mailpieces that are eventually opened by intended recipients.

Individuals who receive and handle mail are encouraged to use safety precautions such as: washing their hands thoroughly with soap and water after handling mailpieces; avoiding shaking mailpieces; avoiding bumping or sniffing mailpieces; and avoiding handling of mailpieces suspected of contamination. These measures can be impractical when the volume of mail is large. Thus, there is an urgent need to exclude or detect life-harming materials that contaminate mail processing equipment in such a way that the likelihood of cross contamination is reduced by timely sampling and detection.

Ideally, it would be desirous for the postal authority to examine and/or test each piece of mail individually for any possible contaminants before it enters the mail system, thereby isolating any contaminated mailpieces and preventing any cross-contamination. Such examination could be performed, for example, by visually inspecting each mailpiece for a powdery substance contained therein. With the large volume of mail processed daily, however, the cost and time associated with visually inspecting each piece of mail makes such inspection unfeasible. It is imperative that any such testing and/or examination be capable of being performed both cost effectively and quickly to avoid delays in processing and delivering the mail.

Thus, there exists a need for a reliable way to quickly and cost effectively sample and/or detect small amounts of loose and possibly dangerous particulate matter in a mail processing equipment. There is an urgent need to sample and/or test the presence of life-harming materials that are included in the mail in such a way that cross contamination is reduced. One of the problems of the prior art is that a system is not available for sampling particulate matter present in mail processing equipment. Therefore, a device for sampling particulate matter in mail processing equipment is needed.

SUMMARY OF INVENTION

This invention overcomes the disadvantages of the prior art by providing a hazardous material detector which can be used to collect sample(s) of material present in the feed path of a mail processing equipment. The detection of hazardous material can help protect the intended recipients of mailpieces processed by the equipment from harm and also afford for less delays in mailpiece processing. Early detection can reduce the occurrences of cross contamination.

The present invention is directed, in general to a mailpiece and more particularly, a hazardous material detector for collecting sample(s) of hazardous materials from a mail processing equipment. The mailpiece generally comprises: an envelope with holes and a test strip for testing particulate matter that comes in contact with the test strip. The test strip is viewable from the outside of the envelope and a color change or the like is an indicator of the presence of hazardous material.

In an embodiment of the present invention, the hazardous material detector is a carrier with a test strip fastened thereto and holes in the detector for intake of hazardous material. In another embodiment the hazardous material detector is an envelope containing a carrier with a test strip. The envelope includes holes for intake of hazardous material. In another embodiment the hazardous material detector is an envelope containing a test strip.

An advantage of the present invention is that it provides a way to detect and thereby limit cross contamination of mailpieces during processing. The mailpiece helps to decrease delays in the mail delivery caused by the presence of biohazardous material in mailpieces. Another additional advantage of the present invention is that the negative impact of delayed mail delivery is reduced. Another advantage of the present invention is that detection is provided quickly. Other advantages of the invention will in part be obvious and will in part be apparent from the specification. The aforementioned advantages are illustrative of the advantages of the various embodiments of the present invention.

BRIEF DESCRIPTION OF DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION

Figure 1:
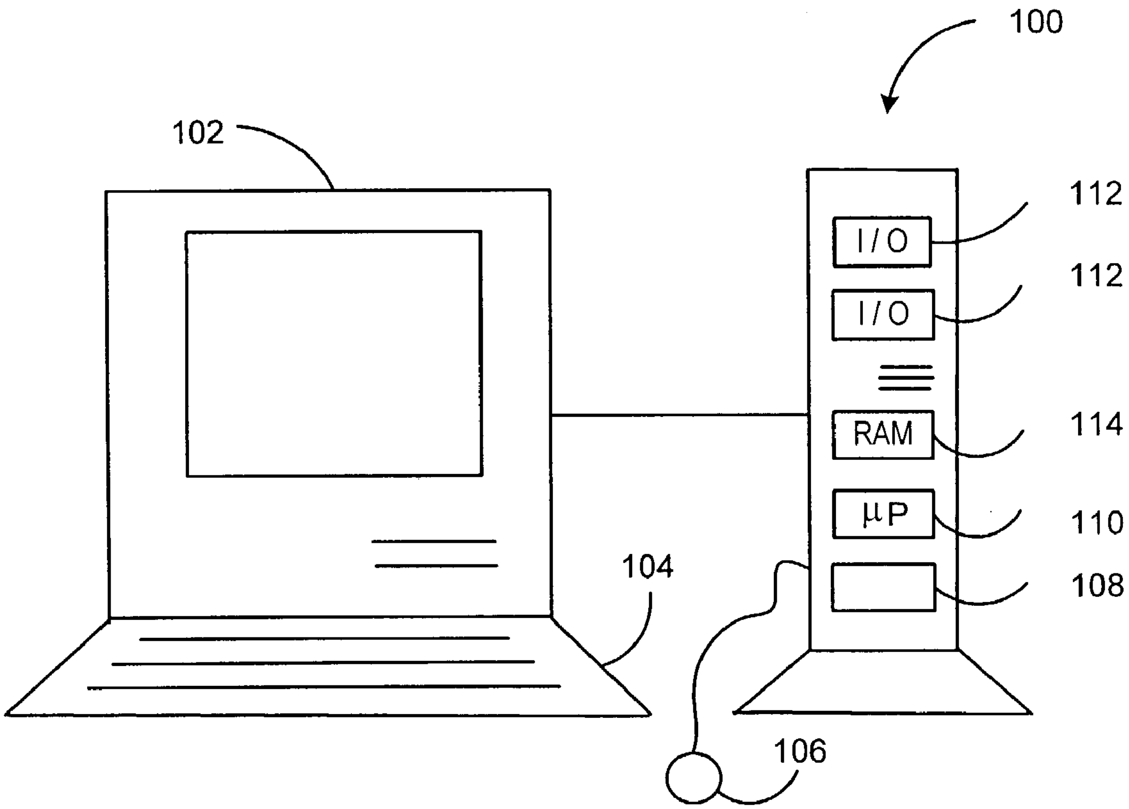
FIG. 1 is a block diagram that illustrates a computer system with which an embodiment of the invention may be controlled.

In describing the present invention, reference will be made herein to FIGS. 1–12 of the drawings in which like numerals refer to like features of the invention. Features of the invention are not necessarily shown to scale in the drawings.

Control Overview

FIG. 1 is a block diagram that illustrates a computer system 100, the use of which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as a Pentium® microprocessor manufactured by Intel, and conventional memory devices such as hard drive 108, floppy or CDRW drive(s) 112, and memory 114.

Figure 2:
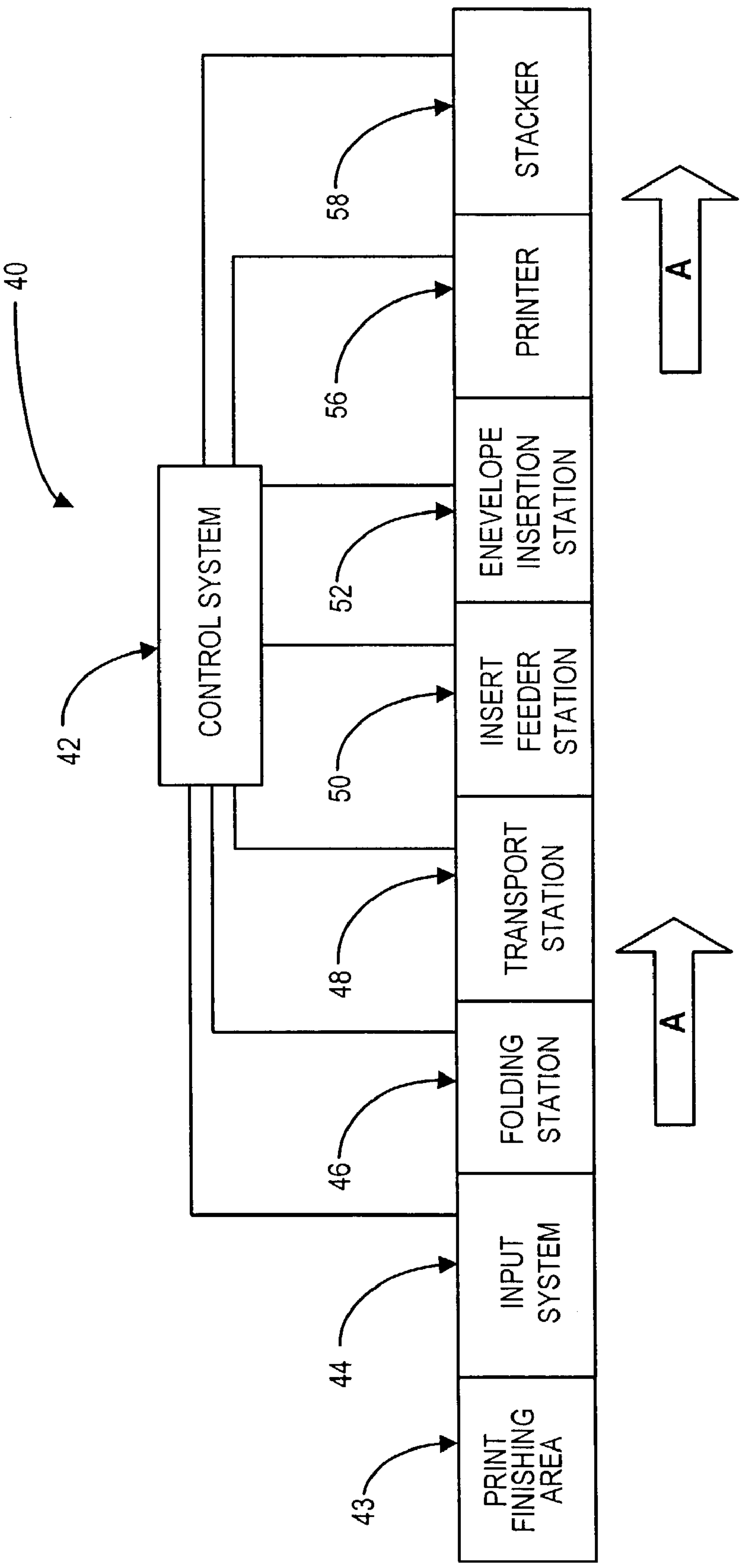
FIG. 2 is a block diagram schematic of a typical document inserting system including an input feeder station.

The computer system 100 can be connected to a inserting apparatus as illustrated in FIG. 2. The control system 100 of the inserter system 40 may be the microprocessor based personal computer system 100 described above. The computer system 100 includes appropriate memory devices 108, 114 for storage of information such as an address database 22. One of ordinary skill in the art would be familiar with the general components of the inserter system with which may be used to prepare the present invention.

Document Inserter System Overview

The present invention, a mailpiece insert for detecting hazardous material, may be inserted into an envelope using a document inserting system 40. FIG. 2 is a schematic of a typical document inserting system, generally designated 40. In the following description, numerous paper handling stations implemented in inserter system 40 are set forth to provide a thorough understanding of the operating environment of the inserter. However it will become apparent to one skilled in the art that the present invention may be practiced without the specific details of these paper-handling stations.

As will be described in greater detail below, system 40 preferably includes an input system 44 that feeds paper sheets and hazardous material detection insert to an accumulating station that accumulates the sheets of paper and other inserts into collation packets (not shown). In this particular example, the apparatus of the present invention can provide mailpiece path information to the control system 100 of inserter system 40.

Typically input system 44 feeds sheets in a paper path, as indicated by arrow A along a deck is commonly called the main deck (not shown) of inserter system 40. After sheets are accumulated into collations by input system 44, the collations are folded in folding station 46 and the folded collations are then conveyed to a transport station 48, preferably operative to perform buffering operations for maintaining a proper timing scheme for the processing of documents in inserting system 40. In the example of the present invention, the hazardous material detection insert may not be folded if it is determined that folding is not needed.

Each sheet collation (and the insert of the present invention) is fed from transport station 48 to insert feeder station 50. It is to be appreciated that a typical inserter system 40 includes a plurality of feeder stations, but for clarity of illustration only a single insert feeder 50 is shown in FIG. 2.

Figure 3A:
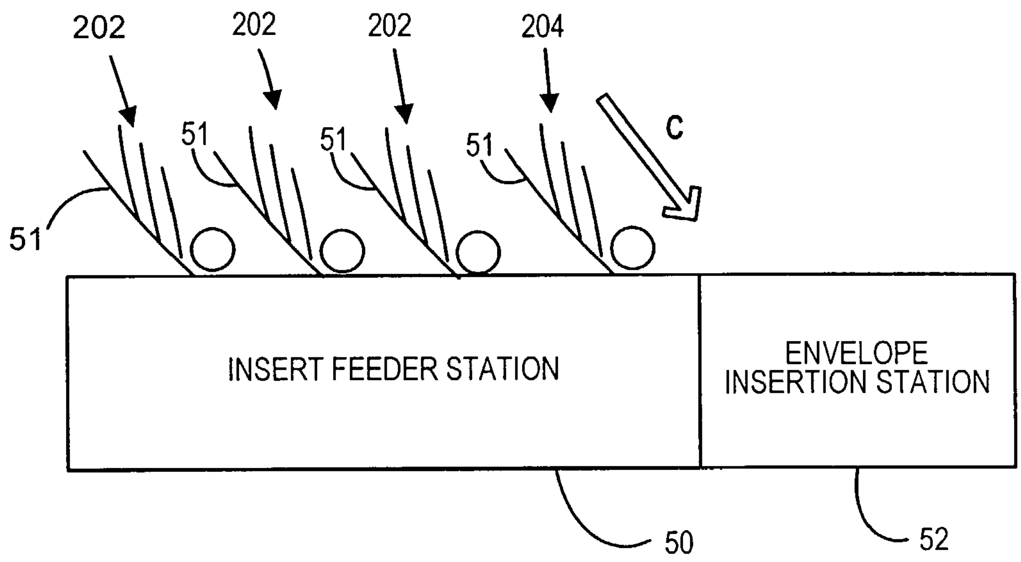
FIG. 3*a* is a block diagram of the insert feeder station illustrating feed trays and various inserts including hazardous material test strips.

FIG. 3*a* provides additional details for the insert feeder 50, insertion station 52 and insert supply trays 51. Insert feeder station 50 is operational to convey an insert (e.g., an advertisement, letter or insert for detecting hazardous material) from a supply tray 51 to the main deck of inserter system 40 so as to be nested with the aforesaid sheet collation being conveyed along the main deck. The insert feeder station of FIG. 3*a* has four insert supply trays 51*a–d*. The inserts move generally in the direction of arrow C into the insert feeder station 50. The number of trays in the embodiment of FIG. 3*a* is exemplary and not meant to limit the invention. A different number of trays could be used as would be determined by one of ordinary skill in the art considering factors such as the type of mailpieces being prepared and the number of inserts desired. FIG. 3*a* illustrates insert supply trays 51*a–c* which, in this example, are configured to insert typical documents 202, such as letters, advertisements, bills and the like. Insert supply tray 51*d* is configured to insert a test strip 204 (or the like, i.e. carrier 211 of FIG. 7) for detecting hazardous material.

The test strips could be commercially available Bio Threat Alert™ Test Strips manufactured by Alexter Technologies LLC of Wheeling Ill. which offer visual results in 1–15 minutes. Other suitable biohazard testing material may be used.

Figure 4:
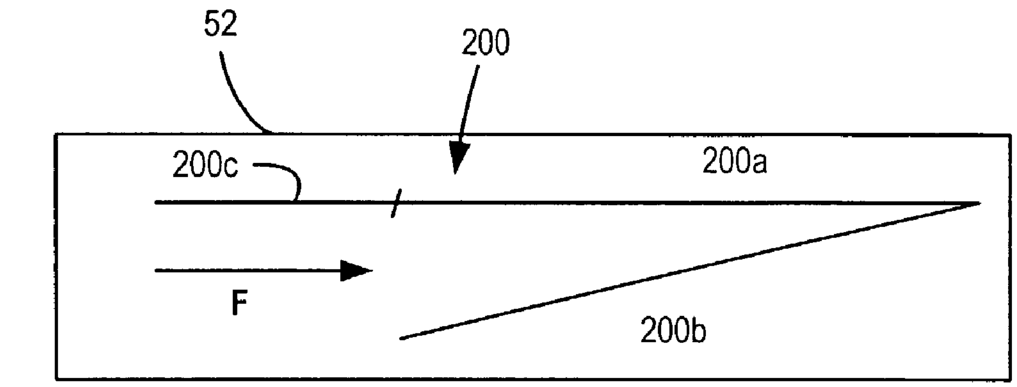
FIG. 4 is a side view of an envelope illustrating the direction that the insert(s) enter the envelope in the present embodiment.

Returning to FIG. 3*a*, inserts from supply trays 51*a–d* are accumulated and inserted into an envelope 200. FIG. 4 is a side view of an envelope 200 illustrating the direction that the insert(s) enter the envelope in the present embodiment. The envelope 200 illustrated in FIG. 4 has a front side 200*a*, a back side 200*b* and a flap 200*c*. The arrow F illustrates the direction that inserts are fed into the mailpiece. It should be noted that the configuration of the envelope with the front side 200*a* facing up is for illustration purposes and not meant to be limiting. Insertion apparatus can typically insert into envelopes that are configured with the front side facing up or facing down. The placement of the envelope and the position of the insert in a particular insert station determines whether the test strip insert 204 will be adjacent to the front side 200*a* or the back side 200*b* of envelope 200. The placement of the inserts and the orientation of the envelopes can be determined by one of ordinary skill in the art. One factor influencing the decision regarding placement includes whether the envelope is a window envelope. If the envelope is a window envelope, the holes would need to be punched on the back side 200*b* and the test strip would be inserted adjacent to the back side 200*b*. If the envelope is a typical, non-window envelope, then the holes can be placed in any position suitable for the particular application.

Figure 3B:
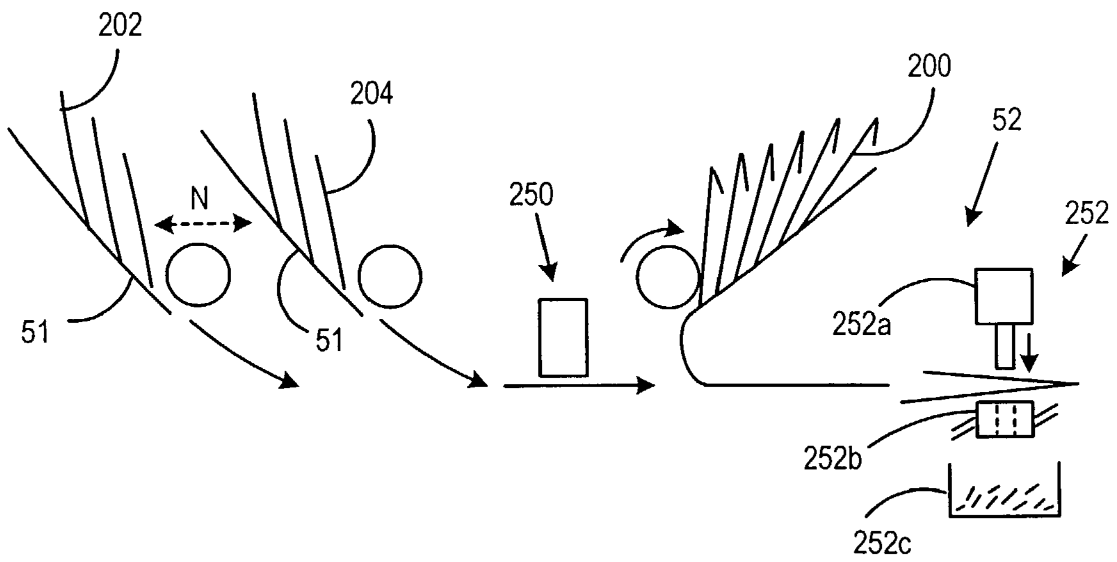
FIG. 3*b* is detailed view of some of the components of FIG. 3*a* and illustrating an alternate configuration and additional details including a printer and an envelope insertion station with a punch device for creating holes in the envelope.

FIG. 3*b* is detailed view of some of the components of FIG. 3*a* and illustrating an alternate configuration and additional details including a printer 250, an envelope insertion station 52 and a punch device 252 for creating holes in the envelope. The notation N indicates that any suitable number of supply trays 51 could be used to perform the invention. The punch device 252 punches one or more holes in the envelope prior to insertion. The punch device comprises a punch 252*a*, an anvil 252*b*, and a container 252*c* for collecting the displaced portion of the punched envelope, such as the portion of the envelope that has been punched out to form the hole (referred to as chips on in FIG. 3*b*). A printer 250 is positioned to print on the insert, and in this example, to print a barcode or Identification (ID) number on the insert. The ID number would serve to preserve a record the time, date or other information pertaining to the insert so that the identification information could later be used in processing. For example, if the envelope 200 containing the insert 204 was destroyed, the ID number could be used to determine when the insert was prepared etc.

Figure 5:
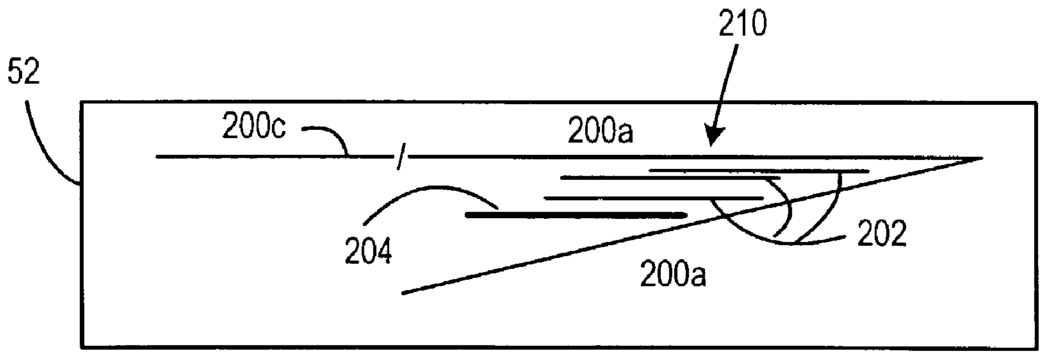
FIG. 5 is a side view of hazardous material detection mailpiece including the envelope of FIG. 4 and illustrating inserts in the envelope including the hazardous material test strip which is positioned adjacent to the back side of the envelope 200.

The sheet collation, along with the nested insert(s) are next conveyed into an envelope insertion station 52 that is operative to insert the collation into an envelope. FIG. 5 is a side view of hazardous material detection mailpiece 210 including the envelope 200 of FIG. 4 and illustrating inserts 202, 204 in the envelope including the hazardous material test strip 204 which is positioned adjacent to the back side 200*b* of the envelope 200.

The embodiment illustrated in FIG. 2, the envelope 200 is conveyed to the postage station 56 where appropriate postage is applied thereto. Finally, the envelope is conveyed to sorting station 58 that sorts the envelopes in accordance with postal discount requirements.

The use of the document inserting system 40, such as, for example, a Series 9 Inserter Systems manufactured by Pitney Bowes Inc. of Stamford, Conn., is well known. Such document inserting systems are used by organizations (e.g., banking institutions, utility companies, insurance companies, credit companies, and the like) for assembling large amounts of outgoing mailpieces for dispatch through the postal system. Typically, such organizations create documents, such as billing documents in a computer such as a mainframe computer system (not shown) that is separate from the document inserting system 40 that will process the documents into such mailpieces. The present invention uses an inserter system 40 to create a hazardous material detection mailpiece.

It should be noted that the hazardous material detection mailpiece 210 can be prepared using an inserter system 40; however, it could also be prepared manually or with other types of mailing system equipment that are suitable for preparation of the present invention. The inserter system 40 could be implemented to prepare hazards material detection mailpieces addressed to various locations including postal sorting facilities and then sent to those facilities via mail or special delivery so that the facility can be tested to obtain results after the mailpiece runs through the feedpath of the sorting equipment. In the preferred embodiment, the mailpiece would not need to be sent to a test lab to obtain results and thus a time delay that could enhance the spread of contamination could be averted. However, if it is desired, the mailpiece could be collected and sent to a test lab. In any event, a mailpiece indicating contamination should be isolated.

Hazardous Material Detector for Detecting Hazardous Material in a Mailstream

Figure 6:
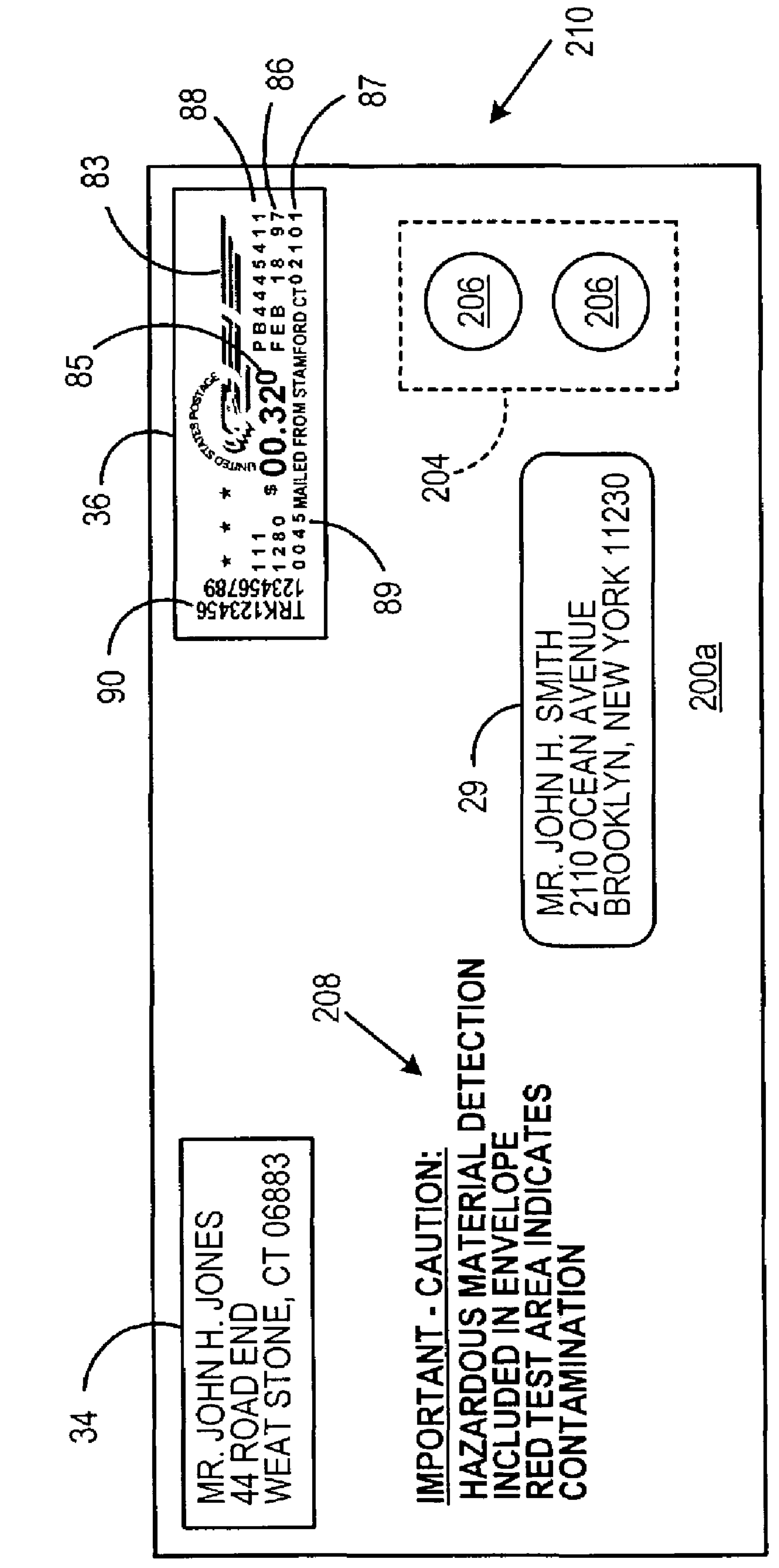
FIG. 6 is a drawing of a mailpiece containing a postal indicia that was affixed by an electronic meter and also including a hazardous material test strip and viewing holes for viewing the test strip.

FIG. 6 is a drawing of a hazardous material detection mailpiece 210 containing a postal indicia 36 that was affixed by an electronic meter. Hazardous material detection mailpiece 210 has a recipient address field 29 printed on the envelope front side 200*a* and a sender address field 8. A postal indicia 36 is affixed to mailpiece 30. Indicia 36 contains a dollar amount 85; the date 86 that postal indicia 36 was affixed to mailpiece 30; the place 87 that mailpiece 30 was mailed; the postal meter serial number 88; an eagle 83; a security code 89; and, a tracking number 90. Security code 89 and tracking number 90 are unique numbers that are derived from address field 29 and information contained in the postage meter that affixed indicia 36. The manner in which security code 89 and tracking number 90 are obtained is disclosed in the Sansone, et al. U.S. Pat. No. 4,831,555 titled UNSECURED POSTAGE APPLYING SYSTEM, assigned to the assignee of the present invention and herein incorporated by reference. The hazardous material detection mailpiece 210 includes a hazardous material test strip 204 which can be viewed through one or more holes 206 in the mailpiece. The holes 206 can be positioned adjacent to indicia 36 or any other suitable position including the back side of the mailpiece. The number of holes can be determined by one of ordinary skill in the art considering factors including the size of the test strip 204.

The hazardous material detection mailpiece 210 can also include a warning label 208 or printed warning, or the like, on the envelope 200. In the embodiment of FIG. 6 the warning states "IMPORTANT CAUTION: HAZARDOUS MATERIAL DETECTION INCLUDED IN ENVELOPE—RED TEST AREA INDICATES CONTAMINATION." In the embodiment of FIG. 6 the test strip 204 changes color to, for example, red, when a hazardous material has been detected. The color change to red is given for exemplary purposes only and other color changes or physical changes associated with various hazardous materials and various types of test strips are possible.

Pitney Bowes offers mailing machine products that provide identification information such as the information in the indicia of FIG. 6, i.e. serial number, date, origin location. Identification information is helpful for tracing the path a mailpiece has be routed by. In addition to offering information for mailpiece tracking, Pitney Bowes offers guide lines for mail security practices so that companies can establish trust with their recipients. The guidelines include metering your mail such as with the Pitney Bowes indicia 36, using a clear identifiable return address such as a printed logo 34*a*, using postcards, avoiding sending samples, using tamper resistant seals, and using tape printed with your company name to seal packages.

Figure 7A:
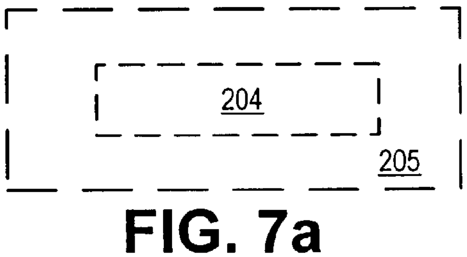
FIG. 7*a* is a view of an embodiment of a first side of hazardous test strip insert.

FIG. 7*a* is a view of an embodiment of a first side of hazardous test strip holder 205. The test strip 204 can be mounted on holder 205. The test strip 204 and holder 205 would comprise an embodiment of a hazardous material detector 210 when inserted into an envelope 200 (as shown in FIG. 7*c* and described below). The test strip could be mounted on holder 205 by any suitable method including but not limited to adhesive or attachment via slots in the holder 205.

Figure 7B:
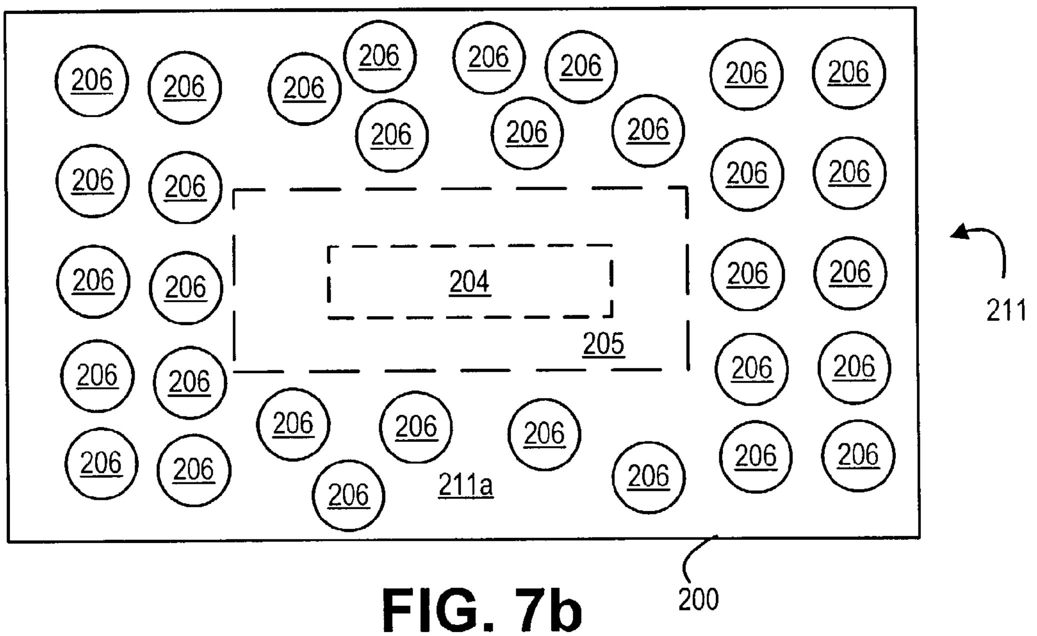
FIG. 7*b* is a view of an embodiment of a first side 211*a* of carrier 211 containing hazardous test strip 204 on holder 205.
Figure 7C:
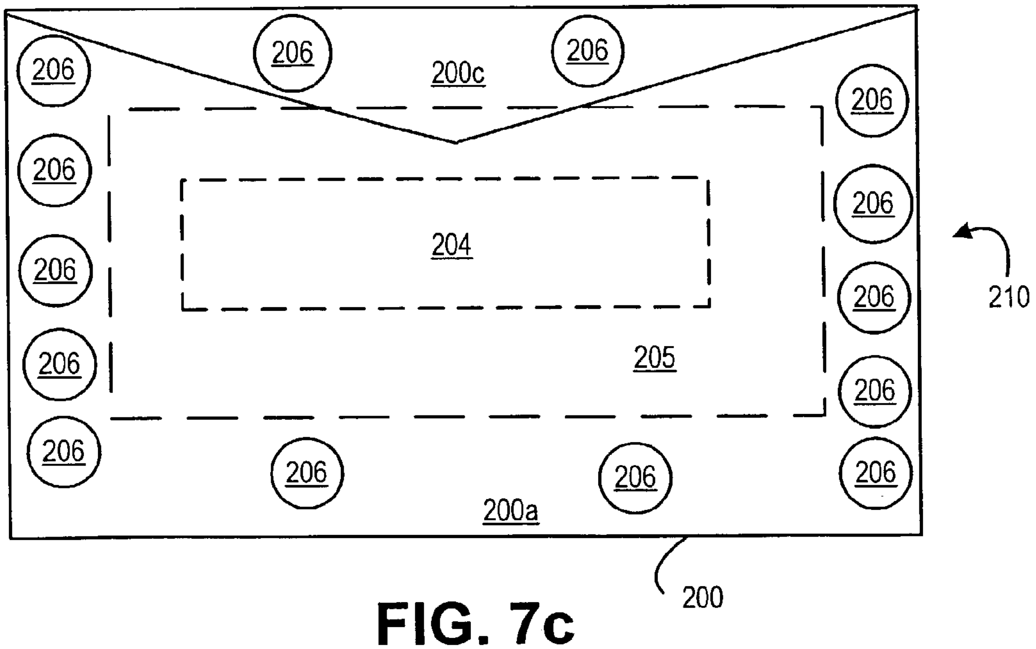
FIG. 7*c* is a view of an embodiment of a first side of hazardous test strip insert in an envelope.

FIG. 7*b* is a view of an embodiment of a first side 211*a* of carrier 211 containing hazardous test strip 204 on holder 205. The test strip 204 and holder 205 are smaller than the carrier 211 so that there is space in the carrier 211 for the test strip to move around. That is, the test strip 204 is loose inside the carrier 211. The carrier 211 of the embodiment of FIG. 7*b* can be made of envelope stock, paper or the like. The carrier 211 should be fabricated in a size that is suitable for insertion into an envelope 200. The edges 212 of carrier 211 are sealed to contain the test strip 204. The carrier can be configured with holes 206 so that hazardous material could pass through the holes 206 or perforations and contact the test strip 204. The carrier 211 being loose inside an envelope 200 and/or the holder 205 being loose inside the carrier 211 provides the opportunity for the test strip to come in contact with hazardous material entering the carrier 211 or envelope 200 from the front side or the back side. The loose fit allows the hazardous material to have space to move around inside the carrier 211 or envelope 200. The holes could also be used to view the color of the test strip 204 in order to determine a whether the test strip 204 is a color that indicates the presence of hazardous material. The carrier in the embodiment of FIG. 7*b* or other suitable carrier could be used as an insert. The carrier 211 could be inserted into an envelope using the insert supply tray 51*d* illustrated in FIG. 7. The insert supply tray 51*d* is configured to insert the carrier 211 into an envelope for use in detecting hazardous material.

Figure 8:
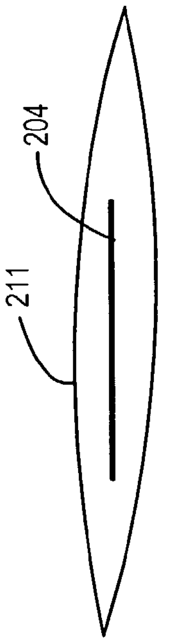
FIG. 8 is an side view of an embodiment of the carrier of FIG. 7*b* illustrating the loose test strip inside the carrier.

FIG. 8 is an side view of an embodiment of the carrier 211 of FIG. 7*b* illustrating the loose test strip 204 inside the carrier 211.

Figure 9:
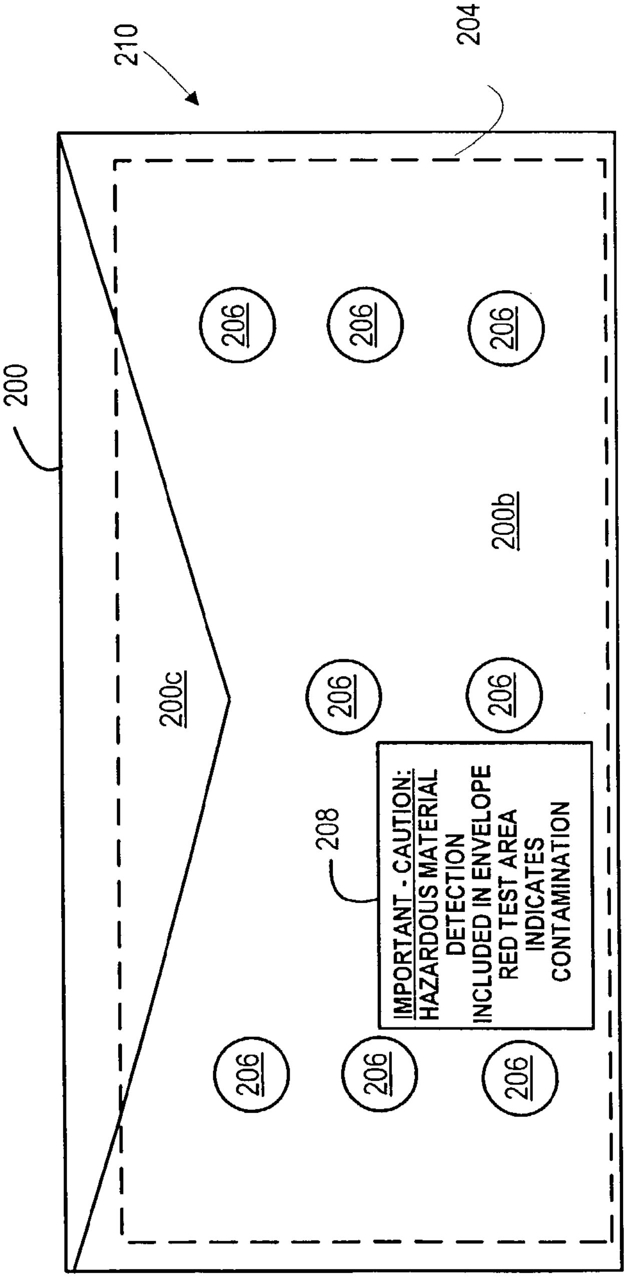
FIG. 9 is an embodiment of a mailpiece of the present invention, also referred to as a hazardous material detection mailpiece 210, illustrating a back side of the mailpiece.

FIG. 7*c* is a view of an embodiment of a first side of hazardous test strip insert in an envelope. This embodiment of the mailpiece 210 of the present invention, also referred to as the hazardous material detection mailpiece 210, illustrates a back side of the mailpiece 210. The mailpiece 210 includes an envelope 200 to contain one or more test strips 204 mounted on a holder 205 and holes 206 in the envelope 200. The envelope 200 comprises a front side 200*a* (shown in FIGS. 4, 5 and 6), a back side 200*b* and an envelope flap 200*c*. The envelope further comprises holes 206 for providing an inlet for hazardous material to contact the hazardous material test strip 204. In this and other embodiments of the present invention, the number of holes 206 illustrated in the envelope is not meant to be limiting and additional holes 206 including holes adjacent to the test strip 204 and holder 205 could be placed in the envelope 200. For simplicity of illustration additional holes were not shown. In the embodiment of FIG. 7*c* the test strip 204 on holder 205 is smaller than envelope 200. The test strip 204 and holder 205 are smaller than the envelope 200 so that there is space in the envelope 200 for the test strip to move around. That is, the test strip 204 and carrier are loose inside the envelope 200. The test strip 204 and holder 205 being loose inside an envelope 200 provides the opportunity for the test strip 204 to come in contact with hazardous material entering the envelope 200 from the front side 200*a* or the back side 200*b*. The loose fit allows the hazardous material to have space to move around inside the envelope 200. The holes 206 in the envelope could also be used to view the color of the test strip 204 in order to determine a whether the test strip 204 is a color that indicates the presence of hazardous material. The envelope 200 in the embodiment of FIG. 7*b* or other suitable carrier could be used as an insert. The holder 205 with affixed test strip 204 could be inserted into an envelope using the insert supply tray 51*d* illustrated in FIG. 7. The insert supply tray 51*d* is FIG. 9 is an embodiment of the mailpiece 210 of the present invention, also referred to as the hazardous material detection mailpiece 210, illustrating a back side of the mailpiece 210. The mailpiece 210 includes an envelope to contain one or more test strips 204, holes 206 in the envelope and a warning indicator 208. The envelope 200 comprises a front side 200*a* (shown in FIGS. 4, 5 and 6), a back side 200*b* and an envelope flap 200*c*. The envelope 200 contains a hazardous material test strip 204 as is illustrated with dotted lines in FIG. 9. The envelope further comprises holes 206 or perforations for providing an inlet for hazardous material to contact the hazardous material test strip 204. The warning label or printed message 208, or the like, in the embodiment of FIG. 9 states "IMPORTANT CAUTION: HAZARDOUS MATERIAL DETECTION INCLUDED IN ENVELOPE—RED TEST AREA INDICATES CONTAMINATION." In the embodiment of FIG. 9 the test strip 204 changes color to, for example, red, when a hazardous material has been detected. The color change to red is given for exemplary purposes only and other color changes or physical changes associated with various hazardous materials and various types of test strips are possible.

The envelope 200 used in mailpiece 210 can be a prefabricated envelope with holes or alternately it can have holes made in it by the inserter system 40. In one example of hazardous material detection, the hazardous material test strip is white or neutral in color and the color changes if the hazardous material test strip is contaminated. If the envelope 200 is made from paper preferably light than 30# bond, the changed color of the hazardous material test strip could show through the front and or back side of the envelope, 200*a*, 200*b*.

Hazardous Material Detector for Detecting Hazardous Material in a Mailstream in Mail Processing Equipment FIGS. 6 and 9 illustrate embodiments of the mailpiece 210 of the present invention for detecting hazardous material 210 preferably in mail processing equipment. The mailpiece for detecting hazardous material 210 generally comprises a first side 200*a*, a second side 200*b*, a flap 200*c* and a detection strip 204. Arrow F generally denotes the direction that the mailpiece moves along a feed path F of mail sorting apparatus or other mail processing devices such as feeder 10 of FIG. 11 (described below).

Figure 10:
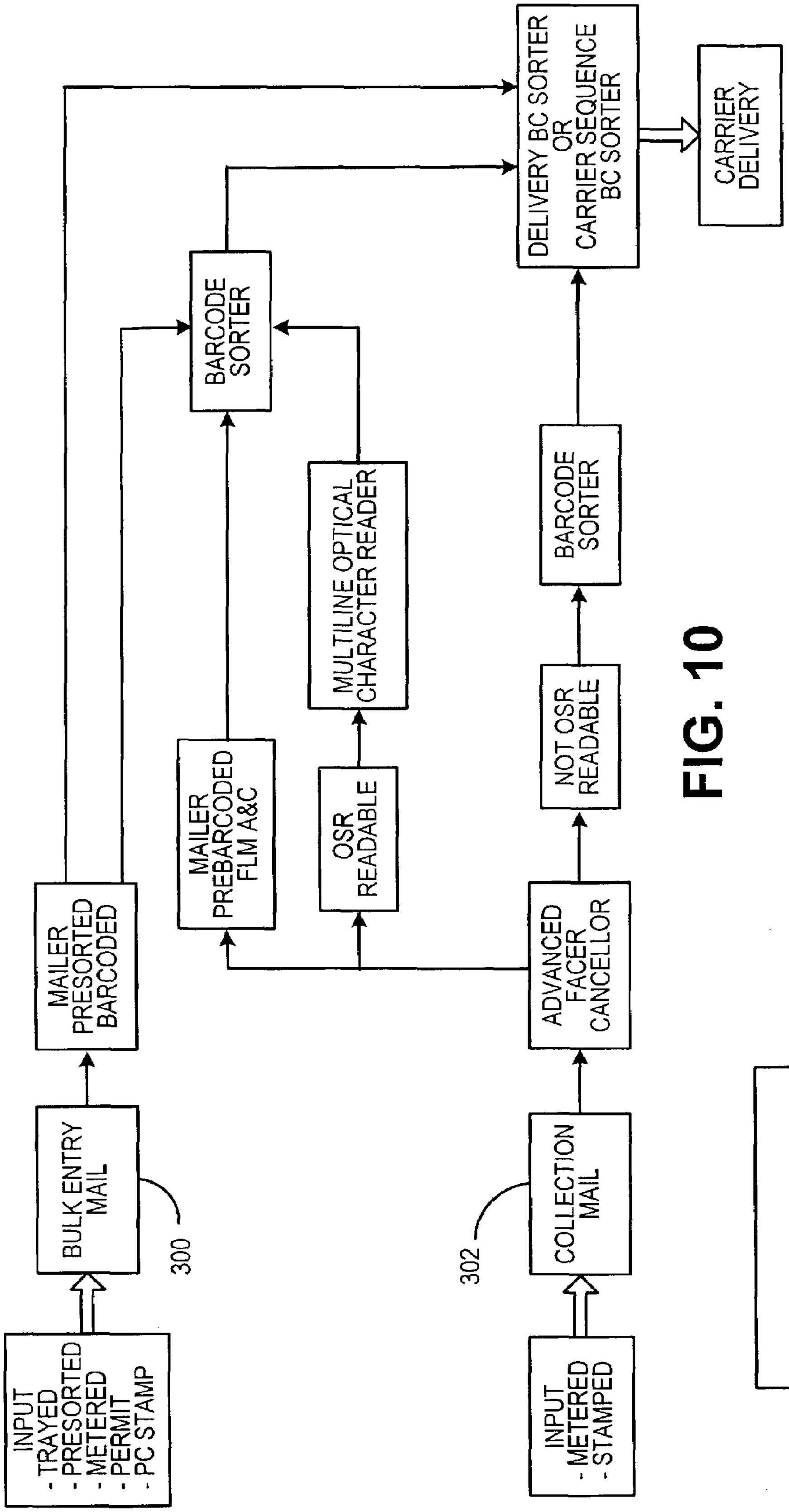
FIG. 10 is a block diagram of letter mail flow at the United States Postal Service.
Figure 12:
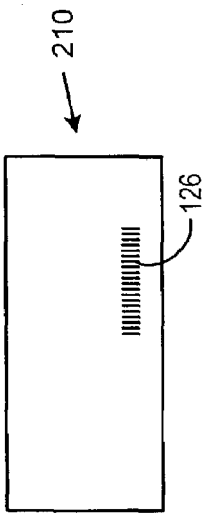
FIG. 12 is an illustration of a side of the mailpiece, the side having identification information thereon.
Figure 11:
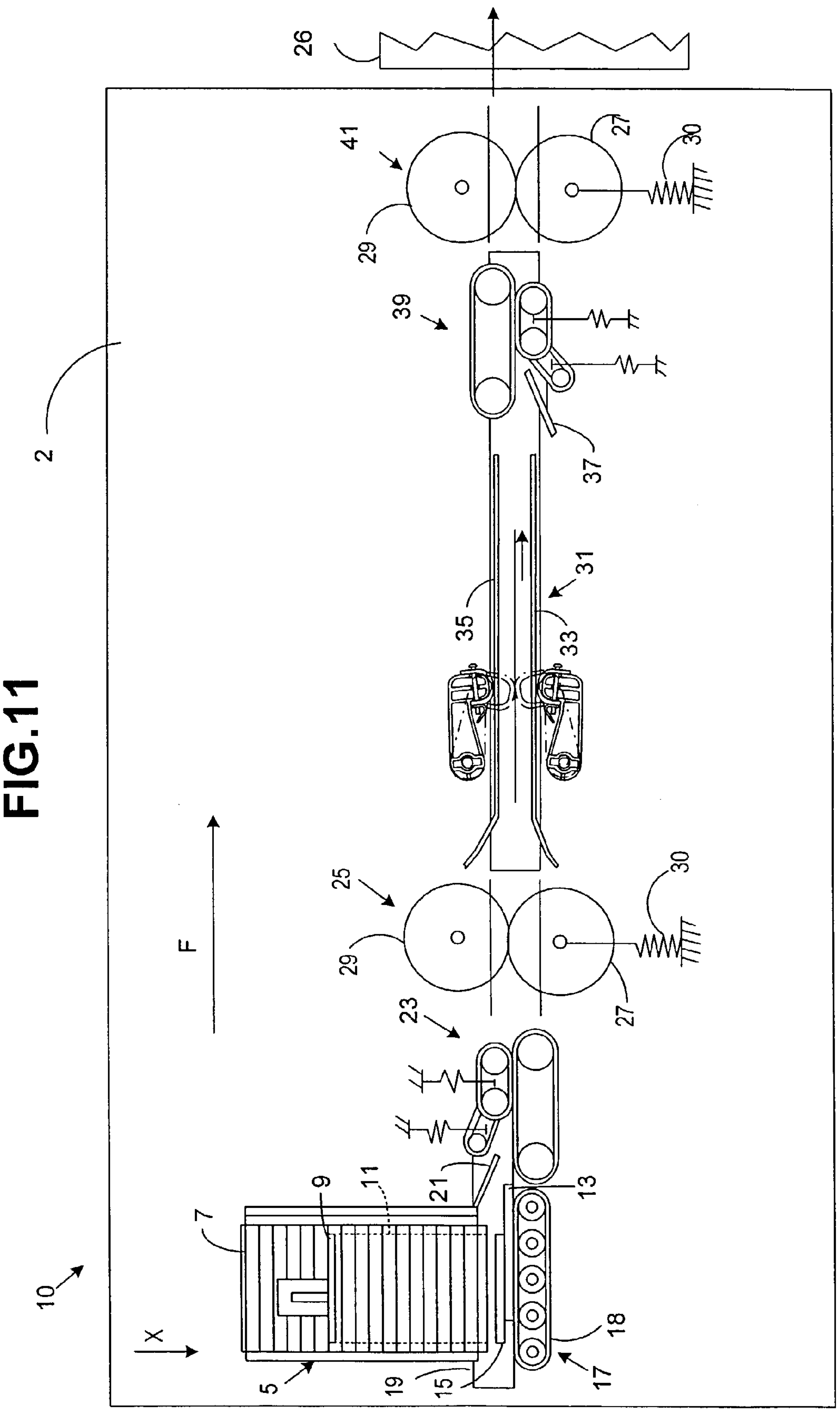
FIG. 11 is an exemplary schematic top plan view of a mail feeder incorporating nip or takeaway rollers which can be used to squeeze the sampling mailpiece of the present invention.

FIGS. 6 and 11 are embodiments of a harmful material detection mailpieces 210. In these embodiments, a test strip 204 is contained in the mailpiece and visible through holes 206 in the envelope 200. The test strip 204 can come in contact with various devices along feed path F of mail processing equipment such as equipment illustrated in FIGS. 10 and 11 (explained below). Through contact, samples of particulate matter can be obtained. The test strip as described above can be a commercially available test strip that changes color upon contact with a hazardous material. The first or second side 200*a*, 200*b* of mailpiece 210 could include instructions (not shown) for controlling the processing of the mailpiece 210 as it passes through mail processing equipment. The instructions could be in the form of a bar code 126 (shown in FIG. 12) such as a mail ID tag. Alternately, in this embodiment and other embodiments, the holes or perforations 206 could be formed in the envelope 200 for allowing hazardous material to pass through and contact the mailpiece.

The mailpiece 210 could be passed through mail processing equipment at various entry points such as bulk mail entrance 300 or collection mail entrance 302 shown in FIG. 10. Other entry points deemed appropriate by an operator facilitating collection using the mailpiece 210 of the present invention could be used. In an alternate embodiment, the mailpiece 210 could be addressed to a test facility which would test the particulate matter captured by test strip 204. The address of the test facility could be positioned on one of the first or second sides 200*a*, 200*b* of the mailpiece 210. The mailpiece 210 could travel through more than one postal processing facility and such information could be associated with the mailpiece ID tag described above. The mailpiece 210 could alternately be passed through processing equipment and obtained by an operator for review and isolation (if the test strip indicates contamination). Alternately, the operator could place the mailpiece 210 in a container. The container could be delivered to the test facility or picked up for delivery to test facility. If possible, depending upon factors such as, for example, the complexity of the testing and the apparatus needed for testing, the testing could be performed at the postal facility.

Automated Mailpiece Feeding & Sorting Overview

The mailpiece 210 of the present invention can be passed through mail processing equipment such as, for example, mail feeding equipment, mail sorting equipment including various mail handling equipment used at postal sorting facilities. FIG. 10 is a simplified block diagram of letter mail flow at a postal sorting facility such as, for example a United States Postal Service postal sorting facility. The mailpiece 210 of the present invention could enter the letter mail flow at any number of physical entrances in the diagram. The determination as to where the mailpiece 210 could enter the mail flow could be made considering factors including, but not limited to, from what particular piece of mail feeding equipment is it desired to have a sample collected there from.

FIG. 11 is a schematic top plan view of a mail feeder incorporating nip or takeaway rollers 27, 29 which can be used to squeeze the sampling mailpiece of the present invention. Feeder 10 is an example of some of the various paper handling devices that can be included along the feed path of a mail sorting apparatus. Mailpiece sorting equipment can typically sort mailpieces of varying sizes. Various devices are included in mail sorting equipment including roller devices which can nip the mailpieces and move the mailpieces along a feed path in the mail sorting apparatus. The feeder 10 of mailpiece sorting apparatus is designed to feed mailpieces of varying sizes, thicknesses and finishes and therefore, can singulate and feed variously configured mailpieces including, for example, envelopes of various sizes, mailpieces of various thickness thick, magazines, variously configured small packages, and the mailpiece 100 of the present invention.

FIG. 11 shows a feeder 10 of a mail sorting apparatus. The feeder 10 has conventional framework 2 upon which all of the components of the feeder 10 are mounted. Feeder 10 includes a stack advance mechanism 5 having a continuous conveyor belt 7 mounted for rotation in a conventional manner about a plurality of pulleys (not shown) in the direction of arrow "X". Mounted on the conveyor belt 7 in a conventional manner is an upstanding panel 9 which moves with the conveyor 7 in the direction of arrow "X". In operation, a stack of mail 11 is placed on the conveyor belt 7 and rests against the panel 9. The stack of mixed mail includes a lead mailpiece 13 and a second mailpiece 15. Thus, as the conveyor belt 7 is set into movement, the stack of mixed mail 11 is moved toward an input feed structure 17. Input feed structure 17 includes a belt 18 which is driven into rotation about a series of pulleys 20, at least one of which is a driven pulley. Accordingly, as the stack advance mechanism 5 forces the lead mailpiece 13 into contact with the belt 18, the lead mailpiece 13 is laterally moved away from stack of mixed mail 11. Additionally, a driven belt 19 which makes contact with the bottom edge of the lead mailpiece 13 also assists in moving the lead mailpiece 13 downstream past a guide mechanism 21 and toward a first document singulating apparatus 23. As shown, the combination of the stack advance mechanism 5, the input feed structure 17, and the guide plate 21 help to present the mailpieces which are removed from the stack of mixed mail 11 into the first document singulating apparatus 23 in a shingled manner. The first document singulating apparatus 23 operates to separate the lead mailpiece 13 from the remaining stack of mixed mail 11 so that only individual mailpieces are presented to output feeding structure 25 for ultimate processing downstream to a processing station 26 where each individual mailpiece has some type of operation (printing, scanning, etc.) performed thereon.

Output feeding structure 25 includes a take away rollers 27 and 29 which receive the mailpiece as it exits the first document singulating apparatus 23 and helps to transport it downstream. The take away rollers comprise a drive roller 29 and an idler roller 27. The take away idler roller 27 is spring loaded by spring 30 and is moveable toward and away from the take away drive roller 29 to accommodate different mailpiece thicknesses. An a aligner station 31 consisting of two guide walls 33, 35 which help to direct the individual mailpieces in a vertical fashion to ensure that they are aligned on their bottom edge prior to transport past a second guide plate 37 and into a second document singulating apparatus 39. Subsequent to passage through the second document singulating apparatus 39, the individual mailpieces are transported into a second set of take away rollers 41 which transport the individual mailpieces to the processing station 26. The second set of takeaway rollers 41 has the same structural components as the first set of take away rollers 25.

The second singulating apparatus 39 has the same structural components as the first singulating apparatus 23 and can be driven by an independent drive system similar to that used for first singulating apparatus 23. The use of the redundant singulating apparatus structure improves the reliability of separating individual documents from each other since, if a multi-feed does pass through the first singulating apparatus 23 it is likely that the second singulating apparatus 39 will effectively separate the documents of a multi-feed.

Exemplary aspects of the feeder 10 that can be used for feeding the mailpiece 100 of the present invention are disclosed in the following: U.S. Pat. No. 5,971,391, issued Oct. 26, 1999 to Salomon et al. titled NUDGER FOR A MAIL HANDLING SYSTEM; U.S. Pat. No. 6,003,857, issued Dec. 21, 1999 to Salomon et al. titled SINGULATING APPARATUS FOR A MAIL HANDLING SYSTEM, U.S. Pat. No. 6,135,441 issued Oct. 24, 2000 to Belec et al. titled TWO STAGE DOCUMENT SINGULATING APPARATUS FOR A MAIL HANDLING SYSTEM; U.S. Pat. No. 6,217,020 issued Apr. 17, 2001 to Supron et al. titled METHOD AND APPARATUS FOR DETECTING PROPER MAILPIECE POSITION FOR FEEDING; and U.S. Pat. No. 6,328,300 issued Dec. 11, 2001 to Stefan et al. titled ALIGNER MECHANISM FOR A MAIL HANDLING SYSTEM and assigned to the assignee of the present invention and incorporated by reference herein.

The mailpiece 210 of the present invention could enter feeder 10 illustrated in FIG. 10 by way of placement in stack 11, placement into aligner station 31 and processed through nip rollers 27, 29. The nip rollers 27, 29 can press on the mailpiece 210 including holes or perforations 206. The mailpiece 210 can then be collected at a down stream end such as down stream processing devices (generally denoted as 26 in FIG. 11) for subsequent testing.

The present invention provides a device and method for helping to deter delays in the mail delivery. Another additional advantage of the present invention is that the negative impact of delayed mail delivery is reduced. It further provides the ability to protect recipients against receipt of life threatening mailpieces. Additionally, it provides the ability to quickly determine the presence of hazardous material in the mail stream or along the feed path of mail processing equipment. While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

The invention claimed is:

1. A hazardous material detector comprising:

an envelope comprising a front side and a back side and a sealable flap for sealing the envelope;

holes formed in at least one of the froth side or the back side of the envelope, wherein said holes provide an inlet for said hazardous materials;

a hazardous material test strip for detecting the presence of hazardous material in contact with the test strip;

wherein the test strip is inserted into the envelope before the envelope is sealed and wherein the test strip is large enough to not fit through the holes; and whereby when hazardous materials are detected by the hazardous material test strip a physical change occurs to the hazardous material test strip and the physical change can be viewed through at least one of said holes formed in the at least one of the front side or the back side of the envelope.

2. The hazardous material detector as claimed in claim 1 wherein the hazardous material test strip is positioned adjacent to the front side of the envelope.

3. The hazardous material detector as claimed in claim 1 wherein the hazardous material test strip is positioned adjacent to the back side of the envelope.

4. The hazardous material detector as claimed in claim 1 further comprising:

a window on the front side of the envelope.

5. The hazardous material detector as claimed in claim 1 wherein:

the test strip includes an identifier associated with time data.

6. The hazardous material detector as claimed in claim 1 wherein the hazardous material test strip is mounted on a holder.

7. The hazardous material detector as claimed in claim 6 wherein the holder and hazardous material test strip mounted thereon are smaller than the envelope and whereby the holder move while positioned inside the envelope.

8. The hazardous material detector as claimed in claim 6 wherein:

the holder substantially fits the envelope and wherein the holder does not move substantially while positioned inside the envelope.

9. The hazardous material detector as claimed in claim 1 wherein the hazardous material test strip is mounted on a holder and contained in a carrier.

10. The hazardous material detector as claimed in claim 9 wherein holes are formed in the carrier.

11. The hazardous material detector as claimed in claim 1 wherein:

the physical change comprises a change in color.

12. The hazardous material detector as claimed in claim 11 wherein:

the change in color is to red.

13. The hazardous material detector as claimed in claim 1 further comprising:

a warning message on the envelope; and the warning message identifies to a user the physical change associated with the presence of a hazardous material.

14. The hazardous material detector as claimed in claim 13 wherein:

the warning message comprises a label affixed to the envelope.

15. The hazardous material detector as claimed in claim 13 wherein:

the warning message is printed on the envelope using ink.

16. The hazardous material detector as claimed in claim 13 wherein:

the warning message is placed adjacent to the at least one hole.

* * * * *